SELF-SYNCHRONIZING COMMUNICATION SYSTEM

Filed Dec. 27, 1960 4 Sheets-Sheet 1

FRANK W. LEHAN
INVENTOR.
BY Allen E. Botney
ATTORNEY

FRANK W. LEHAN
INVENTOR.
BY Allen E. Botney
ATTORNEY

FRANK W. LEHAN
INVENTOR.
BY Allen I. Botney
ATTORNEY

FRANK W. LEHAN
INVENTOR.
BY Allen E. Botney
ATTORNEY 3,158,864

SELF-SYNCHRONIZING COMMUNICATION SYSTEM

Frank W. Lehan, Glendale, Calif., assignor to Space-General Corporation, Glendale, Calif.

Filed Dec. 27, 1960, Ser. No. 78,479
15 Claims. (Cl. 343—200)

Figure 1A:
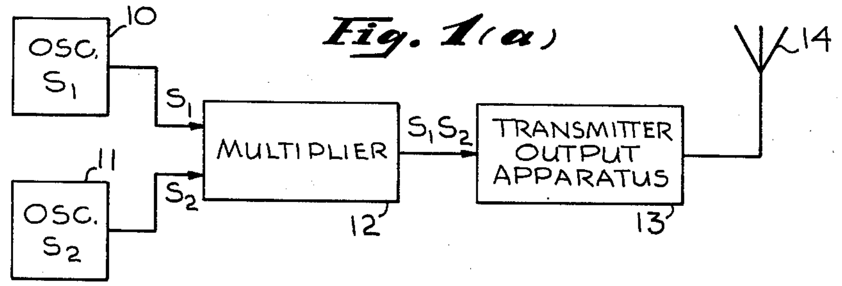

The present invention relates in general to the field of electrical communications and more particularly relates to self-synchronizing communication apparatus.

Techniques presently used to code and decode communication messages may be divided into two basic groups, namely, the techniques used in synchronous systems and those used in non-synchronous systems. The synchronous system requires a stable clock-time base at its receiver site to generate a reference code that could be used for decoding purposes whereas the non-synchronous system depends on a matched filter network in which a reference code is stored for later use. The trouble with systems employing these techniques is that in the synchronous system the clock-time base constantly requires synchronization during operation and in the non-synchronous system the matched filters require a storage capability commensurate with the complexity and variety of the codes employed. Accordingly, there has been a long-felt need for a technique that would make it unnecessary to either generate or store reference codes for decoding purposes. More particularly, there has been a need for a technique in which the message transmission itself would provide the synchronization required for accurate decoding.

The coding and decoding concept of the present invention eliminates the need for receiver synchronization from a stable clock-time base, reference codes in a matched filter network, or other methods presently in use. According to the basic concept of the present invention, an incoming signal is decoded by convergence on synchronization rather than, for example, by searching for a correlation peak. Stated differently, it is the concept of the present invention that, through the use of feedback principles, the incoming signal itself shall provide the reference signals required for both synchronization and decoding. Thus, systems embodying the principles of the present invention are self-synchronizing in nature and when a system receiver is initially out of lock, error signals are generated that force the receiver to converge rapidly to a stable locked condition.

In one embodiment of the invention, the system transmitter includes a number of oscillators whose output signals are generated at respectively different frequencies or, if the signals are non-sinusoidal, at respectively different pulse repetition frequencies. A multiplier in the transmitter then combines the signals out of the oscillators by multiplying them together, the signal thereby formed being a complex pseudo-random type of waveform that spreads the transmitted signal over a large part of the frequency spectrum. Thus, if the output signals of the individual oscillators are indicated as $S_1$, $S_2$ . . . and $S_n$, the multiplier output waveform is the product of $S_1$, $S_2$ . . . and $S_n$. In the receiver, as many different channels are provided as there are oscillators in the transmitter, each channel being associated with one of the oscillators and designed to reproduce the signal generated by that oscillator. Thus, by way of example, the first channel reproduces signal $S_1$, the second channel reproduces channel $S_2$, and so on, with the *n*th channel reproducing signal $S_n$. Each of the referred-to channels includes a balanced modulator and the transmitted waveform, upon receipt, is simultaneously applied to the modulators in all the channels. A number of locally produced reference signals are respectively applied to these balanced modulators at the same time, each reference signal containing all the signal components transmitted except the one associated with the channel to which the reference signal is applied. The action of each balanced modulator due to its inherent operation as a multiplier is such as to remove all the signal components from the output except the signal component associated with that channel. Thus, for sake of clarity, if the transmitted waveform contains signal components $S_1$ through $S_n$ and the locally produced reference signal applied to the balanced modulator in the first channel contains signal components $S_2$ through $S_n$, then the modulator output is signal $S_1$. In a similar manner, outputs $S_2$ through $S_n$ are respectively produced by the balanced modulators in the other channels. These modulator outputs are filtered and limited to reduce the noise components therein and then multiplied together again to form a new complex signal which is a duplicate of the transmitted waveform but relatively noise-free. This newly formed complex signal containing signal components $S_1$ through $S_n$ is then respectively combined with the signal component out of each channel to locally produce the reference signals required by the various channels, that is, the second inputs to the balanced modulators are produced.

It is thus seen that a new technique is being employed to provide synchronization for decoding purposes and that this technique eliminates any necessity for a clock base or for storage of reference codes. It can also be seen that a system based on the present invention can be expanded to include a large number of frequencies and, hence, very complex electrical waveforms that would occupy a large part of the frequency spectrum can be generated by the system. This is a particularly desirable feature from the standpoint of providing jam-resistant equipment. More specifically, the self-synchronizing coding technique of the present invention is applicable to and may be used with great advantage in any system requiring a secure communication link since such a technique would be less susceptible to jamming than one using a synchronized time base arrangement.

It is, therefore, an object of the present invention to provide communications apparatus that is self-synchronizing in nature.

It is an additional object of the present invention to provide a communications system in which information is transmitted by means of pseudo-random types of waveforms.

It is another object of the present invention to provide a communications system that is extremely difficult to jam.

It is a further object of the present invention to provide a communications system wherein multiple feedback is employed for synchronization and decoding purposes.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be especially understood, however, that the drawings are for the purpose of illustration and description only and are not intended as a definition of the limits of the invention.

Figures 2, 3A:
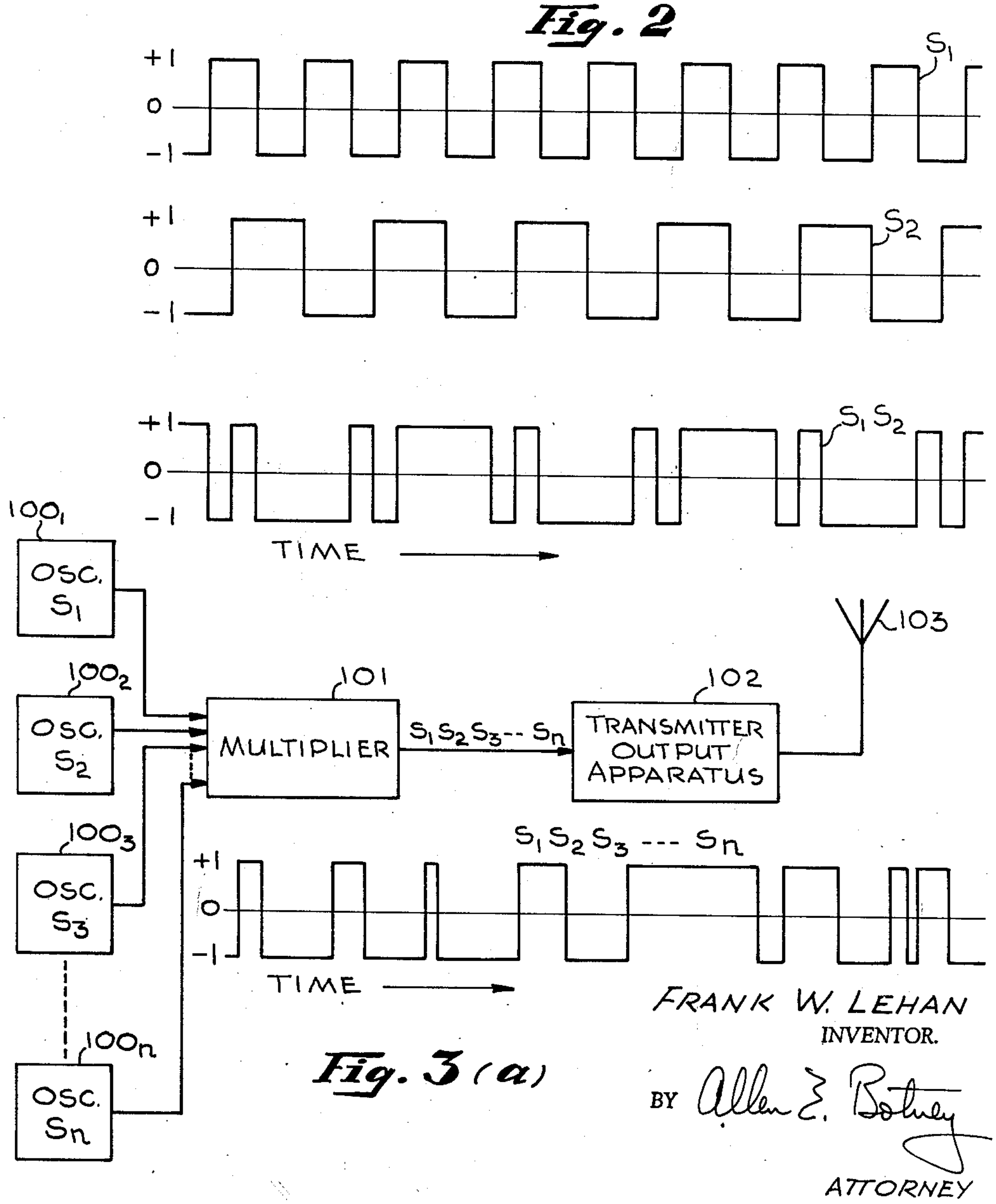
Figure 1B:
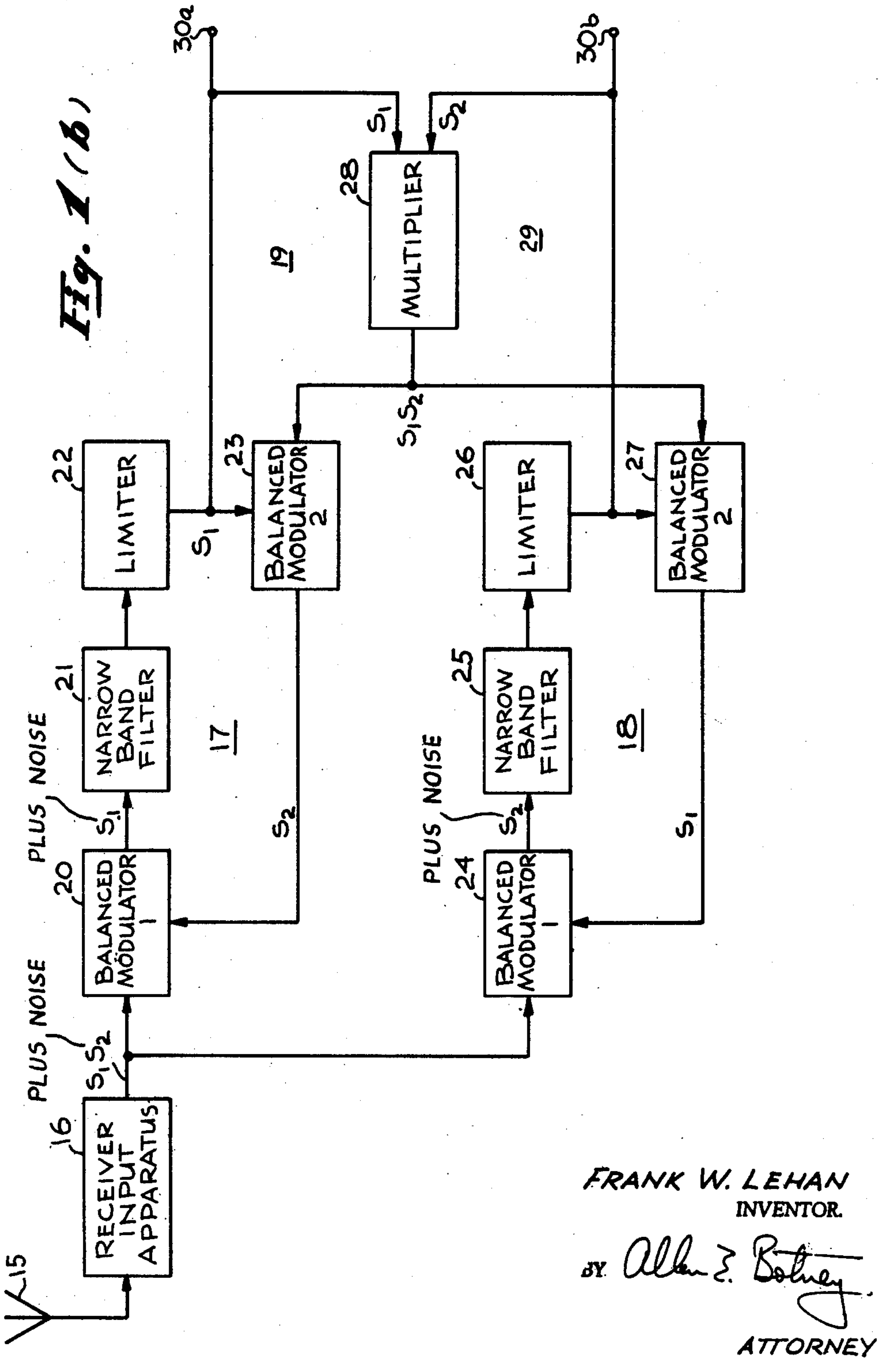
Figure 3B:
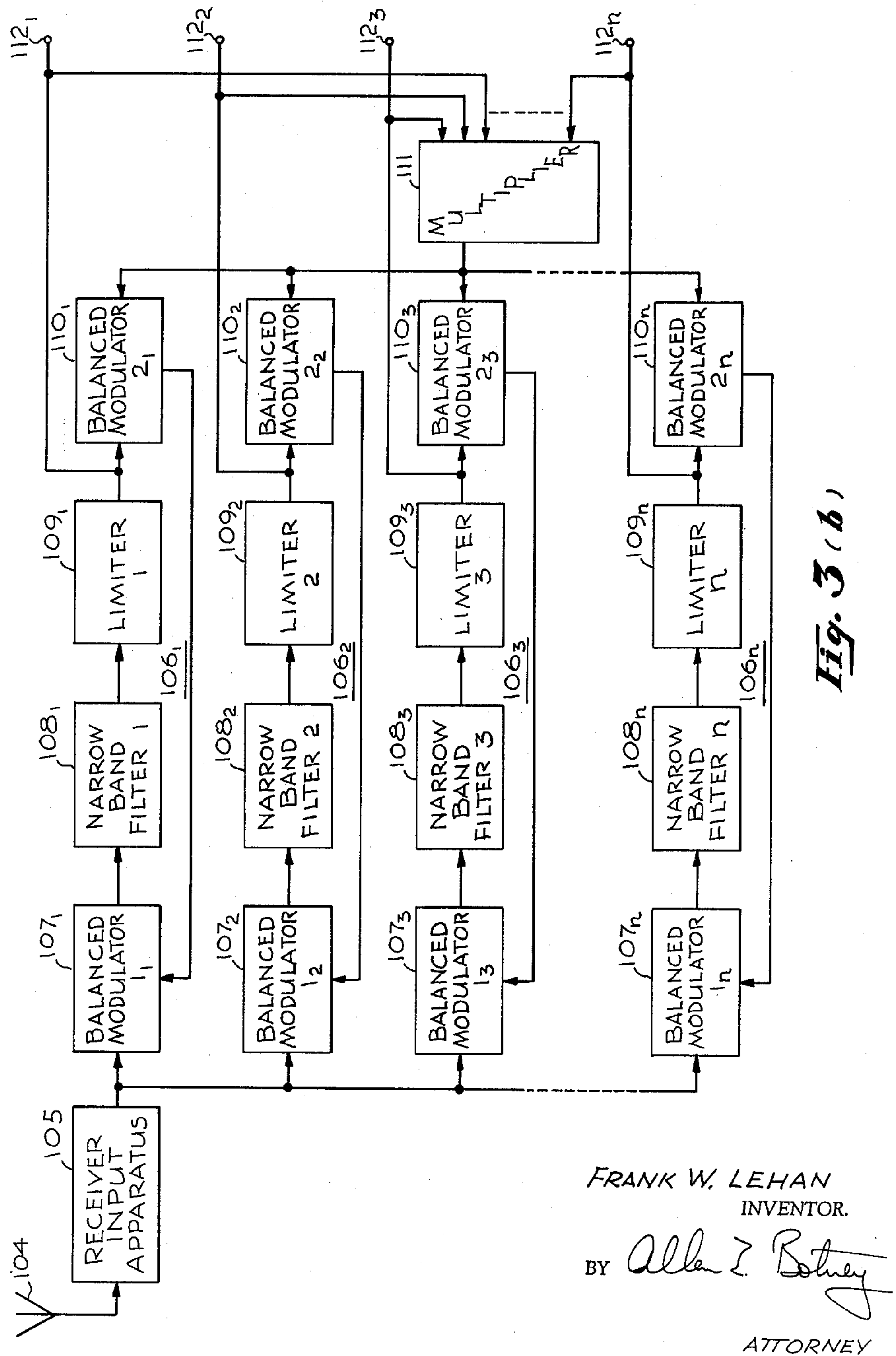
Figure 4:
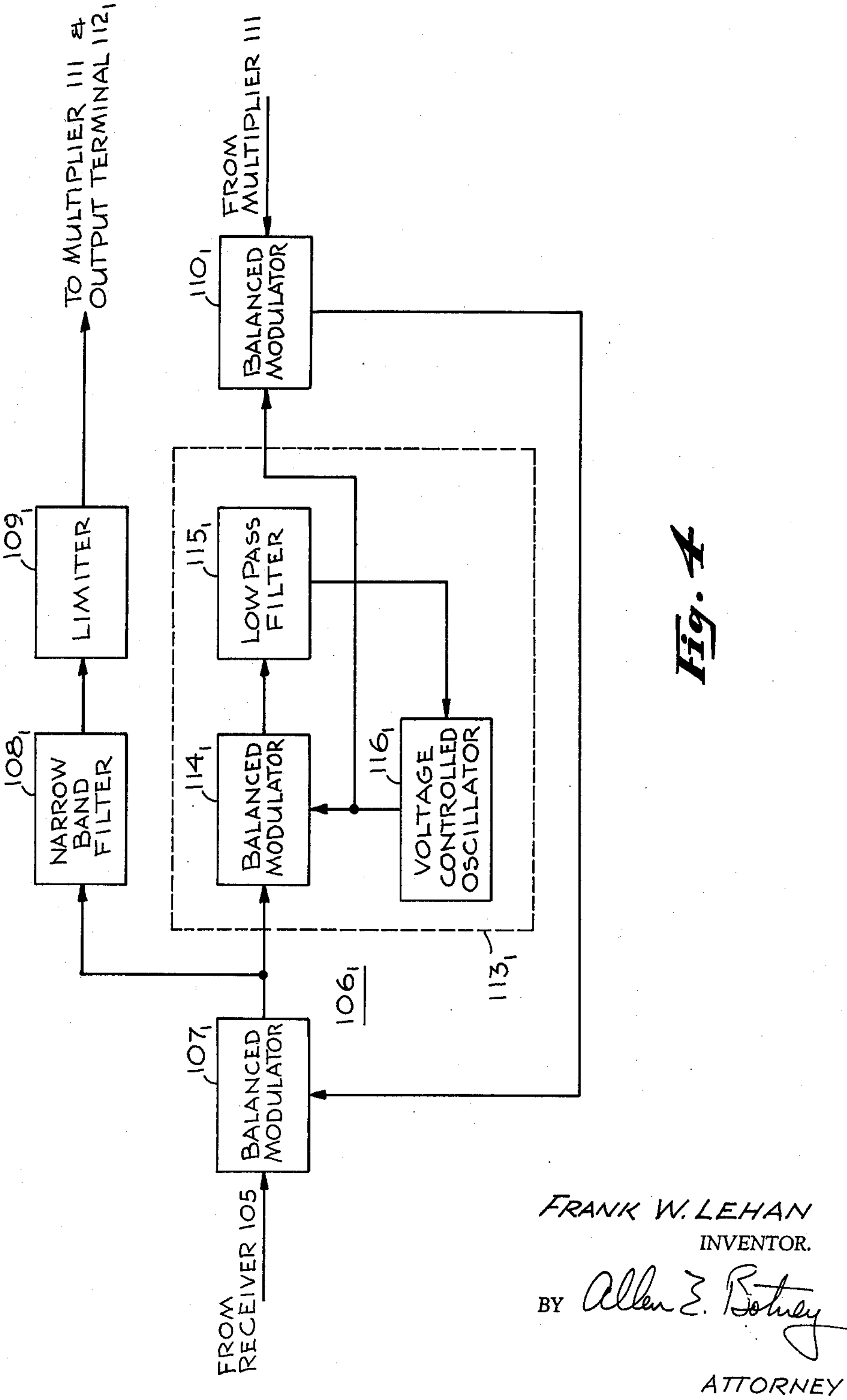

FIGURES 1(*a*) and 1(*b*) are block diagrams that respectively illustrate the transmitter and receiver portions of a communications system according to the present invention, the system shown having minimal capacity;

FIGURE 2 is a flow chart showing the different signal waveforms developed in the communications system of FIGS. 1(*a*) and 1(*b*);

FIGURES 3(*a*) and 3(*b*) are block diagrams that respectively illustrate the transmitter and receiver portions of a communications system like the one shown in FIGS. 1(*a*) and 1(*b*) but of greatly increased capacity; and FIGURE 4 is a block diagram of a portion of the receiver shown in FIG. 3(*b*) and illustrates one way in which that receiver may be modified.

Referring now to the drawings and in particular to FIGS. 1(*a*) and 1(*b*) therein, the transmitter of FIG. 1(*a*) is shown to include a pair of oscillators 10 and 11 connected to separate inputs of a multiplier 12. Transmitter output apparatus 13 is coupled between multiplier 12 and a transmitter antenna 14. With respect to oscillators 10 and 11, these oscillators may be designed to generate any one of a number of different kinds of oscillations, such as ramp voltages, square waves, sinusoidal voltages, sawtooths, etc. However in order to more clearly describe the invention in the discussion that follows, oscillators 10 and 11 will be considered as having been designed to generate square wave waveforms. Furthermore, the signals out of oscillators 10 and 11 are generated at different frequencies or pulse repetition rates. Accordingly, the square waves out of oscillator 10 are generated at one rate while the square waves out of oscillator 11 are generated at another rate. As for multiplier 12, this type of apparatus produces an output that is equal to the product of the signals applied to it and is well known in the art. In the matter of transmitter output apparatus 13, this apparatus includes amplifying and modulation circuitry which is also well known in the art and, hence, need not be described in further detail.

Looking now to FIG. 1(*b*), the receiver is shown to include a receiver antenna 15 coupled to receiver input apparatus 16, which, as may be expected, contains amplifying and demodulation circuitry. The output of receiver apparatus 16 is connected to a pair of channels generally designated 17 and 18, each channel including a first balanced modulator, a narrow band filter, a limiter and a second balanced modulator. In channel 17, the first balanced modulator is designated 20, the narrow band filter is designated 21, the limiter is designated 22 and the second balanced modulator therein is designated 23. Receiver apparatus 16 is connected to the first of two inputs to balanced modulator 20, the output from this modulator feeding directly into narrow band filter 21. Limiter 22 is coupled between filter 21 and the first of two inputs to balanced modulator 23, the output end of modulator 23 being connected back to the second input of balanced modulator 20. It is thus seen that the elements of channel 17 form a feedback loop. Considering channel 18, the first balanced modulator is designated 24, the narrow band filter is designated 25, the limiter is designated 26 and the second balanced modulator is designated 27. As before, receiver input apparatus 16 is connected to the first of two inputs to balanced modulator 24, the second input to this modulator being taken from the output end of balanced modulator 27. Narrow band filter 25 is connected between balanced modulator 24 and limiter 26, the limiter output being connected to the first of two inputs to balanced modulator 27. Here too, the elements of channel 18 form a feedback loop.

The receiver further includes a multiplier 28 like the one to be found in the transmitter of FIG. 1(*a*). In addition to being connected to modulators 23 and 27, limiters 22 and 26 are separately connected to multiplier 28 and also connected to a pair of output terminals 30*a* and 30*b*, as shown in the figure. Terminals 30*a* and 30*b* constitute the output for the receiver and it is at these terminals that the signals originally generated by oscillators 10 and 11 in the transmitter are finally obtained. The receiver circuit is completed by connecting the output end of multiplier 28 directly to the second input of both modulators 23 and 27.

Considering now the operation, oscillators 10 and 11 in FIG. 1(*a*) generate square wave or binary signals which alternate between plus 1 and minus 1 values. Waveforms representing these signals are shown in FIG. 2 and it will be noticed from them that the signals generated by the oscillators are generated at different rates. The waveforms are respectively designated $S_1$ and $S_2$, waveform $S_1$ being generated by oscillator 10 and waveform $S_2$ being generated by oscillator 11. The signals out of the oscillators are applied simultaneously to multiplier 12 whose output, as was previously mentioned, is the product of the signals applied to it. It will be recognized that since the signal generated by each oscillator alternates between plus 1 and minus 1 values, the product signal out of multiplier 12 will also alternate between plus 1 and minus 1 values. The signal or waveform produced by the multiplier is also presented in FIG. 2 and is designated $S_1S_2$ therein. The particular configuration of waveform $S_1S_2$ is dependent upon the frequencies of waveforms $S_1$ and $S_2$ and if these frequencies are all related by prime numbers and are phase coherent with each other, then a pseudo-noise sequence is generated similar to that generated by a linear shift register pseudo-noise generator. The spectrum of such a signal and, hence, the spectrum of signal $S_1S_2$ occupies a wide band of frequencies dependent upon the components that are present.

Multiplier signal $S_1S_2$ is applied to transmitter output apparatus 13 wherein it is amplified and then used to modulate one or more carrier signals for purposes of transmission. The modulated carrier is then power amplified and finally applied to antenna 14 for radiation into space. The modulation may take the form of phase modulation, frequency modulation, amplitude modulation or any other form of modulation that may be suitable and available. By way of example, if frequency modulation were being employed, then the carrier signal would be transmitted at one frequency to represent plus 1 values of signal $S_1S_2$ and at a second frequency to represent minus 1 values. In a similar manner, the carrier signal would be phased differently if phase modulation were being employed.

At the receiver site, the transmitted signal is intercepted by antenna 15 and passed on to receiver input apparatus 16 wherein the signal thusly obtained is both demodulated and amplified. Consequently, the signal produced by receiver apparatus 16 and applied to both balanced modulators 20 and 24 is very much the same as signal $S_1S_2$ shown in FIG. 2, except that a significant amount of noise is now a part of the signal. While signal $S_1S_2$ is applied to the first inputs of modulators 20 and 24, signal $S_2$ is applied to the second input of modulator 20 and signal $S_1$ is applied to the second input of modulator 24. In accordance with the well known operation of these modulators, the signal out of modulator 20 and applied to narrow band filter 21 is square wave signal $S_1$ whereas the signal out of modulator 24 and applied to narrow band filter 25 is square wave signal $S_2$. The output of the modulators 20 and 24 also includes residual transmission channel noise superimposed upon the signals $S_1$ and $S_2$.

Filter 21 and limiter 22 in channel 17 and filter 25 and limiter 26 in channel 18 are respectively effective in taking out much of the noise from signals $S_1$ and $S_2$, with the result that the signals produced at the output terminals of these limiters are relatively noise-free. Square wave oscillation $S_1$ out of limiter 22 is applied to the first input terminal of balanced modulator 23 and, at the same time, is applied to multiplier 28. Similarly, square wave oscillation $S_2$ out of limiter 26 is applied to the first input of balanced modulator 27 and is also simultaneously applied to multiplier 28. In multiplier 28, signals $S_1$ and $S_2$ are multiplied together so that signal $S_1S_2$ is reproduced at the output of the multiplier. This signal, namely, signal $S_1S_2$, is applied to the second inputs of balanced modulators 23 and 27. In response to signal $S_1$ and signal $S_1S_2$, balanced modulator 23 produces signal $S_2$ which it applies to the second input of balanced modulator 20. In this way, a suitable reference signal is obtained for the second input of balanced modulator 20, that is, a reference signal that can be combined by modulator 20 with the signal out of receiver apparatus 16 to produce signal $S_1$. In a like manner, balanced modulator 27 acts in response to signal $S_2$ out of limiter 26 and signal $S_1S_2$ from multiplier 28 to produce signal $S_1$ which it applies to the second input to balanced modulator 24. As previously mentioned, balanced modulator 24 produces square wave oscillation $S_2$ in response to the two signals applied to it.

Relatively noise-free signals $S_1$ and $S_2$ are respectively developed at output terminals 30*a* and 30*b* and, as heretofore mentioned, these are the signals originally generated by oscillators 10 and 11 in the transmitter portion of the system. Accordingly, it is seen that messages transmitted by the transmitter are ultimately reproduced in the receiver at output terminals 30*a* and 30*b* and that this message reproduction is achieved without the need for receiver synchronization from a stable clock-time base, reference codes stored in a matched filter network, or other methods that may be in use at this time.

The operation of the receiver of FIG. 1(*b*) may be more clearly understood by considering the fact that the balanced modulators 20 and 23, for example, act as multipliers in the operation of modulation as is well recognized in the literature, for example "Electronic Circuits and Tubes," Cruft Laboratory, McGraw-Hill, Inc., 1947, pages 660–661, table 8.1. This understanding plus the recognition that each channel includes two feedback loops, namely circuits 17 and 19, and 18 and 29, operating to produce a clean noise-free signal $S_1$ from the complex received signal $S_1S_2$ (plus noise).

Considering the case as illustrated in FIG. 2, of binary signals $S_1$ and $S_2$ of value either $+1$ or $-1$, the input to balance modulator 20 from receiving apparatus 16 is $S_1S_2$ (plus noise) as illustrated in idealized form less noise in the third curve of FIG. 2. When the second input to the modulator 20 is $S_2$ the product of the two input signals is obtained, namely $S_1S_2S_2$ or $S_1(S_2)^2$. In the case of these binary signals of two values $+1$ or $-1$ the quantity $(S_2)^2$ is always equal to $+1$ whereby the output of modulator 20 with these input signals is always $S_1$ (plus noise). The latter noise is removed by the filter 21 and limiter 22 and a clean signal $S_1$ is applied to the output terminal 30*a* and to balanced modulator 23.

This operation presupposes the existence of signal $S_2$ at the second input to the modulator 20. This in fact exists since the modulator 23 operates in the same manner. With the product $S_1S_2$ applied to one input and the derived signal $S_1$ to the other, the same multiplication takes place and $S_1(S_1S_2)$ equals $(S_1)^2S_2$ equals $S_2$.

These mutually dependent feedback loops can be shown to produce the desired convergence by considering the extreme case where $S_2$ is not present, as occurs in one form of coding. As is well-known in the art, as illustrated by the Cruft Laboratory reference supra, row 1, the output of a balanced modulator in the presence of one input alone contains only the input frequency. Therefore, $S_1$ (plus noise) from the receiving apparatus 16 applied to balance modulator 20 produces a noise $S_1$ at its output and a noise-free $S_1$ at terminal 30*a*. In the absence of $S_2$, the input to balanced modulator 23 from multiplier 28 is $S_1$ and its output $(S_1)^2$ equals 1 applied to modulator 20.

The output at the terminal 30*a* therefore is $S_1$ and by analogous reasoning the output at terminal 30*b* is 0. These extreme conditions illustrate the operation of the receiver of FIG. 1(*b*).

Having thus described an embodiment of the present invention in its basic form, attention is now directed to FIGS. 3(*a*) and 3(*b*) wherein is shown the same embodiment but very greatly extended to provide it with much greater message capacity. The transmitter of FIG. 3(*a*) is shown to include a plurality of oscillators $100_1$ to $100_n$ with each oscillator generating a square wave oscillation at a different frequency. As before, the signals generated by the oscillators vary between the limits of plus 1 and minus 1 and, furthermore, the periods and frequencies of these signals bear no simple relationship to each other. Oscillators $100_1$ to $100_n$ are separately connected to a multiplier 101 whose output, in turn, is connected to transmitter output apparatus 102. An antenna 103 is connected to the output end of the transmitter apparatus.

The receiver, shown in FIG. 3 (*b*), includes an antenna 104 which is coupled to receiver input apparatus 105, the output end of the receiver apparatus being connected to a plurality of receiver channels equal in number to the number of oscillators in the transmitter. Consequently, there are *n* receiver channels and these are generally designated $106_1$ to $106_n$. Except for the frequencies or pulse repetition rates involved, channels $106_1$ to $106_n$ are identical in every respect to channels 17 and 18 in FIG. 1(*a*) and, hence, need not be further described. Suffice it to say, therefore, that channels $106_1$ to $106_n$ respectively include first balanced modulators $107_1$ to $107_n$, narrow band filters $108_1$ to $108_n$, limiters $109_1$ to $109_n$, and second balanced modulators $110_1$ to $110_n$, the elements in each of these channels being interconnected in exactly the same manner as the elements in previously referred to channels 17 and 18. The output from each of the *n* channels, taken at the output terminals of limiters $109_1$ to $109_n$, is fed to separate input terminals of a multiplier 111 whose output terminal is then connected to the second inputs of balanced modulators $110_1$ to $110_n$. The output terminals of the receiver are nothing more than taps taken off the output lines of limiters $109_1$ to $109_n$ and they are respectively designated $112_1$ to $112_n$.

Considering now the operation, oscillators $100_1$ to $100_n$ are selectively operable to generate *n* square wave oscillations at *n* different pulse repetition rates, the message being transmitted at any one time being determined by the particular combination of oscillators activated or, stated differently, by the particular group of oscillations combined. Thus, for example, if the oscillations capable of being generated by oscillators $100_1$ to $100_n$ are respectively designated $S_1$ to $S_n$, then a first message may be made up by combining the oscillations out of the first ten oscillators, namely, signals $S_1$ to $S_{10}$. A second message may, by way of example, be made up by replacing one of the signal components in the first message by a signal not previously used. It is thus seen that a great many different messages may be transmitted if *n* is a good-sized number. Whatever the message transmitted, the signal components thereof are applied to multiplier 101 wherein they are multiplied together so that the multiplier produces an output signal that more or less resembles a continuous spectrum. A waveform that is representative of the type of output signal that may be produced by multiplier 101 is shown in FIG. 3(*a*) and is designated $S_1\ S_2\ S_3 \ldots S_n$. The complex signal produced by the multiplier is applied to transmitter output apparatus 102 wherein, as previously explained, it is used to modulate one or more carrier signals depending upon the type of modulation employed. Following apparatus 102, the message is radiated into space by antenna 103.

At the receiver, the message intercepted by antenna 104 is relayed to receiver input apparatus 105 wherein it is both amplified and demodulated. The output from receiver apparatus 105 is, therefore, aside from the added noise, the same as the output from multiplier 101. Thus, if multiplier 101 has produced signal $S_1S_2S_3 \ldots S_n$ of FIG. 3(*a*), then the very same signal is produced at the output of receiver apparatus 105 and applied to channels $106_1$ to $106_n$. These channels operate in exactly the same way as do channels 17 and 18 previously described. By way of example, reference is made to channel $106_1$ wherein the first and second inputs to balanced modulator $110_1$ respectively receive signals $S_1$ and $S_1S_2S_3 \ldots S_n$, the latter signal coming from multiplier 111. In response to these two signals, balanced modulator $110_1$ applies a signal $S_2 S_3 \ldots S_n$ to the second input to balanced modulator $107_1$ which, because of the signals applied to it, produces signal $S_1$ as an output signal. Signal $S_1$ is passed through filter $108_1$ and limiter $109_1$ for noise elimination and then applied both to multiplier 111 and to the first input of balanced modulator $110_1$. Signal $S_1$ also appears at output terminal $112_1$. In the same way, the remaining channels produce signals $S_2, S_3 \ldots$ and $S_n$ at their respective output terminals.

One way in which messages can be transmitted was described above and this way primarily consists in combining different groups of oscillations. Messages can also be transmitted in another way, namely, in a way that involves "jittering" or varying the pulse repetition rates of the oscillations in a prescribed manner within very narrow limits which, it will be recognized by those skilled in the art, will depend upon the frequency limits of the narrow band filters in the receiver channels. Thus, in addition to being able to form messages by the simple expedient of combining different groups of oscillations, messages may also be formed by slightly varying the pulse repetition rates of the oscillations in any one group. Of course, frequency selection and frequency variation may be combined to make it possible to form still larger numbers and varieties of messages for transmission.

The receivers of FIGS. 1(*b*) and 3(*b*) may be modified by the insertion of a phase-lock loop in each of the channels thereof, a phase-lock loop aiding in the convergence towards synchronization. The manner in which a receiver channel is modified to include a phase-lock loop is shown in FIG. 4 wherein only a single receiver channel is illustrated, namely, channel $106_1$ of FIG. 3(*b*). One channel only is shown both to expedite the description and for sake of clarity since all channels are modified in exactly the same way. As may be seen from a comparison of channels, channel $106_1$ shown in FIG. 4 differs from channel $106_1$ shown in FIG. 3(*b*) in only two respects, namely, the electrical connection between limiter $109_1$ and balanced modulator $110_1$ has been eliminated and a phase-lock loop circuit $113_1$ has been interposed between balanced modulator $107_1$ and balanced modulator $110_1$. More specifically, the output end of limiter $109_1$ still connects to multiplier 111 and to output terminal $112_1$ but is no longer connected to the first input to balanced modulator $110_1$. Instead, phase-lock loop $113_1$ connects to the first input of balanced modulator $110_1$. In all other respects the interconnections of channel $106_1$ remain the same as they were previously. Phase-lock loop $113_1$ includes a balanced modulator $114_1$, a low-pass filter $115_1$ and a voltage-controlled oscillator $116_1$. Balanced modulator $114_1$ has two inputs, one input connecting to the output end of balanced modulator $107_1$ and the other input connecting to the output of voltage-controlled oscillator $116_1$. Low-pass filter $115_1$ is coupled between the output end of balanced modulator $114_1$ and the input end of voltage-controlled oscillator $116_1$, thereby completing the loop. Finally, the output from oscillator $116_1$ is also fed to the first input to balanced modulator $110_1$.

Considering the operation of a channel as modified in FIG. 4, the output of balanced modulator $107_1$ is signal $S_1$. This signal is successively passed through narrow-band filter $108_1$ and limiter $109_1$ to multiplier 111 as well as to output terminal $112_1$. Signal $S_1$ out of balanced modulator $107_1$ is also applied to the first input of balanced modulator $114_1$, a second signal $S_1$ that is locally generated by voltage-controlled oscillator $116_1$ being applied to the second input of balanced modulator $114_1$. Since these two signals are most probably out of phase with each other initially, an error signal of varying amplitude is developed at the output end of balanced modulator $114_1$. This error signal is passed to low pass filter $115_1$ which smooths the signal to produce a direct-current error signal which the filter applies to voltage-controlled oscillator $116_1$. In response to the error signal applied to it, the oscillator adjusts the phase of the signal generated by it until it is in phase with the signal out of balanced modulator $107_1$. At this point in time, the error signal is reduced to zero so that no further adjustment of phase is made by the oscillator.

Properly phased signal $S_1$ out of oscillator $116_1$ is applied to the first input to balanced modulator $110_1$, signal $S_1S_2S_3 \ldots S_n$ being applied to the second input of the modulator by multiplier 111. As a result, the signal out of modulator $110_1$ and applied to the second input to balanced modulator $107_1$ is signal $S_2S_3 \ldots S_n$. Modulator $107_1$ takes the two signals applied to it, namely, signal $S_1S_2S_3 \ldots S_n$ applied to its first input terminal and signal $S_2S_3 \ldots S_n$ applied to its second input terminal, and responsively produces signal $S_1$ at its output end which, as was previously mentioned, it applies to narrow-band filter $108_1$ as well as to balanced modulator $114_1$ in phase-lock loop $113_1$. The cycle of operation is thus completed.

In the event signal component $S_1$ is not included in the signal applied to the first input to balanced modulator $107_1$, it will be recognized or may be determined by tracing through the cycle of operation that under these conditions substantially no signal is produced at the output of modulator $107_1$, that is to say, no signal $S_1$ is produced by the modulator. Consequently, no signal $S_1$ appears at output terminal $112_1$ nor does a signal component $S_1$ appear in the reference signal produced at the output end of balanced modulator $110_1$ and fed back to the second input to balanced modulator $107_1$. It may, therefore, be further noted that with the receiver channels modified as illustrated and described in connection with FIG. 4, message combinations may be formed by utilizing the technique of frequency selection or frequency variation or both.

It should finally be noted that still other modifications of the embodiment herein described may be effected without departing from the spirit or scope of the invention. Thus, as a simple example, where noise is not a significant factor for consideration, limiters $109_1$ to $109_n$ may be eliminated or taken out from the various receiver channels.

Having thus described the invention, what is claimed as new is:

1. Communications apparatus comprising: first transmitter means for generating a pair of signals respectively at first and second frequencies; second transmitter means coupled to said first means for multiplying said signals together to produce a complex output signal; third transmitter means for radiating said output signal through space; first receiver means for intercepting and reproducing said complex output signal; second and third receiver means coupled to said first receiver means to receive said complex output signal, said second receiver means being operable in response to said complex output signal and first reference signal at said first frequency to reproduce the signal at said second frequency and said third receiver means being operable in response to said complex output signal and a second reference signal at said second frequency to reproduce the signal at said first frequency; fourth receiver means coupled to said second and third receiver means for multiplying together the signals at said first and second frequencies to reproduce said complex signal; and fifth and sixth receiver means coupled to said fourth receiver means and respectively coupled to said second and third receiver means, said fifth receiver means being operable in response to said complex signal and the signal at said first frequency to produce a first reference signal and said sixth receiver means being operable in response to said complex signal and the signal at said second frequency to produce a second reference signal, said fifth and sixth receiver means respectively being additionally coupled to said second and third receiver means for applying said first and second reference signals thereto.

2. Communications apparatus comprising: first transmitter means for generating first and second signals at respectively first and second frequencies; second transmitter means coupled to said first transmitter means for multiplying said first and second signals together to produce a complex output signal; third transmitter means for radiating said complex signal through space; first receiver means for intercepting and reproducing said complex signal; second receiver means coupled to said first receiver means and operable in response to said complex signal and a first reference signal at said second frequency to reproduce said first signal; third receiver means coupled to said first receiver means and operable in response to said complex signal and a second reference signal at said first frequency to reproduce said second signal; and fourth receiver means coupled in a feedback arrangement to said second and to said third receiver means, said fourth means being receptive of said first and second signals and operable in response thereto to produce said first and second reference signals for application to said second and to said third receiver means, respectively.

3. A communication system comprising: a transmitter for radiating a complex pseudo-random waveform constituting the product of $n$ signal components respectively at $n$ different frequencies; first receiver means for intercepting and reproducing said complex waveform; $n$ circuits coupled to said first receiver means and operable in response to said complex waveform and $n$ reference signals respectively applied thereto to respectively reproduce said $n$ signal components; and second receiver means coupled in a feedback arrangement with each of said $n$ circuits, said second receiver means being receptive of said $n$ signal components and operable in response thereto to produce $n$ reference signals for application to said $n$ circuits, respectively, each of said reference signals having $n-1$ of the $n$ signal components with the missing signal component being different from those missing from the other reference signals.

4. A communication system comprising: a transmitter for radiating a complex pseudo-random waveform constituting the product of $n$ signal components respectively at $n$ different frequencies; first receiver means for intercepting and reproducing said complex waveform; $n$ circuits coupled to said first receiver means to receive said complex waveform, said $n$ circuits being operable in response to said complex waveform and $n$ reference signals respectively applied thereto to respectively reproduce said $n$ signal components; second receiver means coupled to said $n$ circuits for multiplying together said $n$ signal components to reproduce said complex waveform; and $n$ networks coupled to said second receiver means and respectively coupled to said $n$ circuits, said $n$ networks being operable in response to said reproduced complex waveform and said $n$ signal components respectively applied thereto to respectively produce $n$ reference signals for application to said $n$ circuits, each reference signal having $n-1$ of said $n$ signal components, the signal component absent from each reference signal being different from those absent from the other reference signals.

5. In a communications system wherein a complex pseudo-random waveform constituting the product of $n$ signal components at respectively $n$ different frequencies is radiated through space to a receiver site, a receiver comprising: first receiver means for intercepting and reproducing the complex waveform; $n$ circuits coupled to said first means to receive the complex waveform, said $n$ circuits being operable in response to the complex waveform and $n$ reference signals respectively applied thereto to respectively reproduce the $n$ signal components of the complex waveform; second receiver means coupled to said $n$ circuits for multiplying together said $n$ signal components to reproduce the complex waveform; and $n$ networks coupled to said second receiver means and respectively coupled to said $n$ circuits, said $n$ networks being operable in response to said reproduced complex waveform and said $n$ signal components respectively applied thereto to respectively produce $n$ reference signals for application to said $n$ circuits, each reference signal having $n-1$ of said $n$ signal components, the signal component absent from each reference signal being different from those absent from the other reference signals.

6. In a communications system wherein a complex pseudo-random wave form constituting the product of $n$ signal components at respectively $n$ different frequencies is radiated through space to a receiver site, a receiver comprising: first receiver means for intercepting and reproducing the complex waveform; $n$ circuits coupled to said first receiver means and operable in response to the complex waveform and $n$ reference signals respectively applied thereto to respectively reproduce the $n$ signal components; and second receiver means coupled in a feedback arrangement with each of said $n$ circuits, said second receiver means being receptive of the $n$ signal components and operable in response thereto to produce $n$ reference signals for application to said $n$ circuits, respectively, each of said reference signals having $n-1$ of the $n$ signal components with the missing signal component being different from those missing from the other reference signals.

7. In a communication system wherein a complex waveform is radiated into space toward a receiver site having first and second signal components at first and second frequencies, respectively, a receiver comprising: first receiver means for intercepting and reproducing the complex signal; second receiver means coupled to said first means and operable in response to the complex waveform and a first reference signal at the second frequency to reproduce the first signal component; third receiver means coupled to said first means and operable in response to the complex waveform and a second reference signal at the first frequency to reproduce the second signal component; and fourth receiver means coupled in a feedback loop with said second and said third means, said fourth means being receptive of said first and second signal components and operable in response thereto to produce said first and second reference signals, respectively.

8. In a communication system wherein a complex waveform is radiated into space toward a receiver site having first and second signal components at first and second frequencies, respectively, a receiver comprising: first receiver means for intercepting and reproducing the complex waveform; second and third receiver means coupled to said first means to receive said complex waveform, said second means being operable in response to said complex waveform and a first reference signal at the second frequency to reproduce the first signal component and said third means being operable in response to said complex waveform and a second reference signal at the first frequency to reproduce the second signal component; fourth receiver means coupled to said second and third receiver means for multiplying together said reproduced first and second signal components to reproduce said complex waveform; and fifth and sixth receiver means coupled to said fourth receiver means and respectively coupled to said second and third means, said fifth means being operable in response to said complex waveform and said first signal component to produce said first reference signal and said sixth receiver means being operable in response to said complex waveform and said second signal component to produce said second reference signal, said fifth and sixth means respectively being additionally coupled to said second and third means for applying said first and second reference signals thereto.

9. In a communications receiver wherein a complex pseudo-random signal constituting the product of $n$ signal components respectively at $n$ different frequencies is produced, receiver apparatus for reproducing said $n$ signal components, said receiver apparatus comprising: $n$ circuits receptive of the complex signal and respectively receptive of $n$ reference signals, said $n$ circuits being operable in response to said signals to respectively produce the $n$ signal components; means coupled to said $n$ circuits for multiplying together said $n$ signal components to reproduce the complex signal; and $n$ networks coupled to said means and respectively coupled to said $n$ circuits, said $n$ networks being operable in response to said reproduced complex signal and said $n$ signal components respectively applied thereto to respectively produce $n$ reference signals for application to said $n$ circuits, each reference signal having $n-1$ of said $n$ signal components, the signal component absent from each reference signal being that produced by the circuit to which the reference signal is applied.

10. In a communications receiver wherein a complex pseudo-random signal constituting the product of $n$ signal components respectively at $n$ different frequencies is produced, receiver apparatus for reproducing said $n$ signal components, said receiver apparatus comprising: $n$ first balanced modulators receptive of the complex signal and respectively receptive of $n$ reference signals, said $n$ balanced modulators being operable in response to said signals to respectively produce the $n$ signal components; $n$ noise-rejection circuits respectively coupled to said $n$ first balanced modulators to pass relatively noise-free signal components; a multiplier network coupled to said $n$ noise-rejection circuits for multiplying the $n$ signal components together to reproduce a relatively noise-free complex signal; and $n$ second balanced modulators coupled to said multiplier and respectively coupled to said $n$ noise-rejection circuits, said $n$ second balanced modulators being operable in response to said reproduced complex signal and the $n$ signal components applied thereto to respectively produce $n$ reference signals for application to said $n$ first balanced modulators, each reference signal having $n-1$ of said $n$ signal components, the signal component absent from each reference signal being that produced by the first balanced modulator to which the reference signal is applied.

11. A communications system comprising: a transmitter including $n$ oscillators for generating $n$ oscillations respectively at $n$ different frequencies, means for multiplying said $n$ oscillations together to produce a complex pseudo-random signal, and apparatus for radiating said complex signal into space; and a receiver including means for intercepting and reproducing said complex signal, $n$ first balanced modulators receptive of said complex signal and respectively receptive of $n$ reference signals, said $n$ balanced modulators being operable in response to said signals to respectively produce said $n$ oscillations, $n$ noise-rejection circuits respectively coupled to said $n$ first balanced modulators to pass relatively noise-free oscillations, a network coupled to said $n$ noise-rejector circuits for multiplying together said $n$ oscillations to reproduce a relatively noise-free complex signal, and $n$ second balanced modulators coupled to said network and respectively coupled to said $n$ noise-rejection circuits, said $n$ second balanced modulators being operable in response to said reproduced complex signal and said $n$ oscillations applied thereto to respectively produce $n$ reference signals for application to said $n$ first balanced modulators, each reference signal having $n-1$ of said $n$ oscillations as components thereof, the oscillation absent from each reference signal being that produced by the first balanced modulator to which the reference signal is applied.

12. In a communications receiver wherein a complex pseudo-random signal constituting the product of $n$ signal components respectively at $n$ different frequencies is produced, receiver apparatus for reproducing said $n$ signal components, said receiver apparatus comprising: $n$ first circuits receptive of the complex signal and respectively receptive of $n$ reference signals, said $n$ first circuits being operable in response to said signals to respectively produce the $n$ signal components; means coupled to said $n$ first circuits for multiplying together said $n$ signal components to reproduce the complex signal; $n$ phase-locked circuits for newly generating the $n$ signal components, said $n$ phase-locked circuits respectively being coupled to said $n$ first circuits for synchronizing said newly generated signal components with those produced by said $n$ first circuits; $n$ second circuits coupled to said multiplying means and respectively coupled to said $n$ phase-locked circuits, said $n$ second circuits being operable in response to said newly generated signal components and the reproduced complex signal to respectively produce $n$ reference signals, each reference signal having $n-1$ of said $n$ signal components, the signal component absent from each reference signal being that produced by the first circuit to which the reference signal is applied, said $n$ second circuits respectively being coupled to said $n$ first circuits in order to apply said $n$ reference signals thereto.

13. The receiver apparatus defined in claim 12 wherein each of said $n$ phase-locked circuits includes a voltage-controlled oscillator for generating an oscillation at the same frequency as the signal component produced by the associated first circuit; a balanced modulator coupled both to said oscillator and the associated first circuit, said modulator being operable in response to the signals applied thereto to produce a variable voltage indicative of the difference in time of occurrence between said oscillation and the associated signal component; and a filter coupled between said balanced modulator and said oscillator for smoothing said variable voltage to apply an error signal to said oscillator, said oscillator adjusting the time of occurrence of said oscillation in response to said error signal according to the amplitude and polarity thereof.

14. A communications system comprising: a transmitter including $n$ oscillators for generating $n$ oscillations respectively at $n$ different frequencies, means for multiplying said $n$ oscillations together to produce a complex pseudo-random signal, and apparatus for radiating said complex signal into space; and a receiver including means for intercepting and reproducing said complex signal, $n$ first balanced modulators receptive of said complex signal and respectively receptive of $n$ reference signals, said $n$ circuits being operable in response to said signals to respectively produce said $n$ oscillations, means coupled to said $n$ first modulators for multiplying together $n$ oscillations to reproduce said complex signal; $n$ phase-locked circuits for newly generating the $n$ oscillations, said $n$ phase-locked circuits respectively being coupled to said $n$ first modulators for synchronizing said newly generated oscillations with those produced by said first modulators; $n$ second balanced modulators coupled to said multiplying means and respectively coupled to said $n$ phase-locked circuits, said $n$ second modulators being operable in response to said newly generated oscillations and the reproduced complex signal to respectively produce $n$ reference signals, each reference signal being composed of $n-1$ of said $n$ oscillations, the oscillation absent from each reference signal being that produced by the first balanced modulator to which the reference signal is applied, said $n$ second modulators respectively being coupled to said $n$ first modulators in order to apply said $n$ reference signals thereto.

15. The system defined in claim 14 wherein each of said $n$ phase-locked circuits includes a voltage-controlled oscillator for generating an oscillation at the same frequency as the oscillation produced by the associated first balanced modulator; a third balanced modulator coupled both to said oscillator and the associated first modulator, said third modulator being operable in response to the signals applied thereto to produce a variable voltage indicative of the difference in time of occurrence between said oscillations; and a filter coupled between said third balanced modulator and said oscillator for smoothing said variable voltage to apply an error signal to said oscillator, said oscillator adjusting the time of occurrence of its oscillation in response to said error signal according to the amplitude and polarity thereof.

References Cited by the Examiner

UNITED STATES PATENTS

| | | | |
|---|---|---|---|
| 2,108,117 | 2/38 | Gardere et al. | 325—329 |
| 2,519,223 | 8/50 | Cheek | 328—160 XR |

OTHER REFERENCES

"Electronic Circuits and Tubes," Cruft Laboratory, McGraw-Hill, Inc., 1947, pp. 660–661.

DAVID G. REDINBAUGH, *Primary Examiner*.

GEORGE N. WESTBY, *Examiner*.